United States Patent [19]
Gupta

[11] 3,802,915
[45] Apr. 9, 1974

[54] SUGAR COLORING PROCESS
[75] Inventor: Ashis S. Gupta, Marietta, Ga.
[73] Assignee: The Coco-Cola Company, Atlanta, Ga.
[22] Filed: Nov. 30, 1972
[21] Appl. No.: 310,755

[52] U.S. Cl.................. 127/63, 127/30, 426/177, 426/250
[51] Int. Cl. .............................................. C13f 3/00
[58] Field of Search............... 127/30, 63; 99/148 R; 426/250

[56] References Cited
UNITED STATES PATENTS
3,397,063  8/1968  Carlson............................. 99/148 R
3,619,294  11/1971  Black................................ 127/63 X Primary Examiner—Morris O. Wolk
Assistant Examiner—Sidney Marantz

[57] ABSTRACT

A sugar coloring process for producing an improved free-flowing, non-hygroscopic, crystalline in nature, colored sugar powder. The process involves the admixing of sugar crystals with a small amount of water in an agitating device for a pre-determined time until the surface of the sugar crystals are sufficiently moistened. Thereafter, a dried food dye is added to the wetted sugar crystals in the agitating device and all these ingredients (water-sugar-dye) are thoroughly mixed for a pre-determined time until the desired color intensity is acquired. Due to the limited amount of water that is required in the process and the unique manner or timing in which all of the ingredients are combined, no additional drying step is required to produce a free-flowing colored sugar powder.

7 Claims, No Drawings

SUGAR COLORING PROCESS

BACKGROUND OF THE INVENTION

This invention relates to a process of coloring sugar wherein an improved colored sugar powder is produced. The powder is non-hygroscopic, free-flowing, crystalline in nature and uniformly colored throughout.

When referring to a colored sugar powder in the title and specification, it will be recognized that by "powder" is meant a sub-divided solid material that has so little free moisture that it is free-flowing and can be readily spooned from a jar or other container. No specific particle size is to be implied other than it be such that the material is free-flowing and will dissolve to a large extent in a liquid within a reasonable period of time.

There are presently available a wide variety of sugar coloring processes wherein a dried sugar product is colored with an aqueous dye solution. For example, in U.S. Pat. No. 1,172,113, a process is taught for producing coloring tablets for candy which consists of the steps of providing an aqueous solution of sugar, gelatin and a color soluble in a sugar mixture, concentrating the solution to such a degree that the mass is formed into tablets and subsequently dividing the mass that is formed thereby into tablets. Another U.S. Pat. No. 2,428,665, teaches a method of imparting colors to cereal particles and comprises the steps of mixing dry cereal particles with finely ground dry edible color pigments and simultaneously subjecting the ingredients while being mixed to steam pressure for increasing the absorption of the pigments into said particles, forcing said pigments into the particles under pressure, and heat fixing the pigments within the interstices of the cereal particles. Another U.S. Pat. No. 3,162,541, teaches a means for coloring materials wherein a suitable color is bound by means of cellulose crystallite aggregates that are dispersed throughout the sugar product during a mixing operation, and wherein the ingredients are subsequently dried by a conventional absorption and/or adsorption process. There are also processes such as taught in U.S. Pat. No. 3,397,063 that teach making a new and improved fruit beverage drink wherein a suitable food coloring solution is formed and subsequently sprayed onto sugar crystals so that the sugar crystals are uniformly impregnated with the color matter. During the use of such a process, low proportions of coloring solutions are normally used and applied to the sugar so as to provide a uniformly colored product. The patent teaches that the drying step may be minimized by the use of a desiccating agent during the mixing operation. In addition to the above processes, there are other known processes for coloring sugar such as shown in U.S. Pat. Nos. 1,841,432; 3,293,133; 3,322,545; 3,575,957; 3,615,672; and 3,671,265.

Briefly summarizing the prior art, it is believed that a number of the patents illustrate the basic concept of coloring sugar by means of a process wherein an aqueous dye solution is sprayed onto and mixed with dry sugar crystals. However, in order to uniformly color the sugar crystals, it is necessary to provide a substantial amount of water in the dye solution and spray the dye solution onto the sugar crystals. This results in a wet sugar product which is not free-flowing and which requires a subsequent drying operation in order to produce a dried and free-flowing sugar powder. It is recognized that there are also patents that teach that a colored sugar product may be produced by mixing an aqueous dye solution with sugar crystals wherein an additional ingredient such as gelatin, cellulose crystallites or an organic solvent are used to promote the dispersion of said dye coloring over the surface of the sugar particles. A problem is also encountered in these processes since a subsequent drying operation is also required due to the substantial amount of water that results in the sugar slurry. While one known patent teaches that the subsequent drying operation may be minimized somewhat by the addition of a desiccating agent to the sugar mixture, here again some drying is required since the desiccating agent itself merely accelerates the dehydration of the sugar crystals. It is believed that there are patents that teach the mixture of a dried food coloring with dried sugar crystals, however, the resulting sugar product produced by those processes is not uniformly colored and the color intensity of the sugar is unsatisfactory.

It is believed that while these patents, when taken either singly or in combination, teach the certain concepts of mixing a food color, water and sugar crystals during the preparation of a colored sugar product, none of these patents recognize that a more efficient operation may be provided which alleviates the drying step by the unique manner or timing in which all of the ingredients are combined.

OBJECTS OF THE INVENTION

It is, accordingly, an object of the present invention to provide an improved and economical process for uniformly coloring sugar. It is a further object of the present invention to provide a uniformly colored sugar product without the necessity of a substantial drying operation. It is yet another object of the invention to provide an improved colored sugar powder which is free-flowing, non-hygroscopic, crystalline in nature, and uniformly colored throughout. Another object of the present invention is to provide a process for coloring sugar with rapidity and economy and without any substantial drying of the sugar crystals. It is a further object of the present invention to produce a colored sugar product by virtue of the manner or timing in which water and dried food dye are mixed with sugar crystals. Another object of the invention is to provide a process wherein the color intensity of the sugar may be easily controlled by changing the percentage of the surface moisture on the sugar crystals and the mixing time, thus affording a wide range of colors available for us. Further objects of the invention will become apparent upon the understanding of the following description of selected embodiments of this invention and upon a study of the appended claims.

SUMMARY OF THE INVENTION

We have discovered a new sugar coloring process for producing an improved free-flowing, non-hygroscopic sugar powder that can be readily reconstituted in a liquid or beverage, or blended into dry beverages, candies, baked goods, puddings and decorations. Our efficient and economical operation results by virtue of the unique manner or timing in which all of the ingredients are combined, which in turn alleviates the requirement of a drying operation. Our process recognizes that these features are critical and that a certain surface phenomenon results therefrom. More specifically, this surface phenomenon occurs if a small amount of water is sprayed or poured uniformly over bulk sugar crystals prior to the addition of a dried food dye. We have found that once the sugar crystals are slightly moistened the sugar crystals absorb the water and as the surface of the sugar crystals begins to dissolve, a dried food dye may be added which colors the surface of some sugar crystals. Upon surface-to-surface contact of these colored sugar crystals with adjacent non-colored sugar crystals, certain colored pigments are transferred to the non-colored crystals and a uniformly dispersed colored sugar crystal product is formed. Due to the limited amount of water that is necessary and required in our process, no additional drying step is needed to produce a free-flowing, bright in color sugar product.

This same phenomenon does not occur in conventional sugar coloring processes wherein the water is added to the food dye prior to being admixed with the sugar crystals, apparently due to the fact that more water is required to form an aqueous dye solution. Moreover, it is believed that the dye solution in those conventional coloring processes will not spread uniformly over the sugar crystals when added thereto unless the solution contains a sufficient amount of water to disperse the same throughout the sugar crystals.

The present invention has many advantages over conventional sugar coloring techniques. In addition to the primary advantage of being a practical and economical process, the process has an advantage of allowing the color intensity of a dried powder to be adjusted by merely adjusting the mixing time without changing the total amount of dry color in the sugar mixture. This could not be done in conventional techniques. Since the color of any reconstituted drink will depend on the total amount of dry color in the product, the present process will render a wide range of colors in the dried powder without changing the color of the reconstituted drink.

Of course, the present invention is a more economical process since no additional drying step is involved. Thus the processing cost is reduced during the sugar coloring operation.

The present invention will be better understood by referring to the following examples of specific embodiments of sugar coloring processes according to the present invention. It should be recognized that the colored sugar product defined in the following examples may be used not only in the production of a reconstituted liquid beverage, but as aforesaid, also in dry beverages, candies, baked goods, puddings and decoration.

DETAILED DESCRIPTION OF THE INVENTION

EXAMPLE 1

Conventional Sugar Coloring Process 0.333 grams of food color were dissolved in 10 cc of water. The concentrated color solution was slowly added to 907 grams of confectioner's sugar 6X while mixing in a Hobart blender. The color intensity of the powdered sugar was very light. Another 160 cc of water were necessary to develop the proper color. The product was very wet and needed an additional drying step.

EXAMPLE 2

Conventional Sugar Coloring Process 0.333 grams of food color were dissolved in 10 cc of water. The concentrated color solution was slowly added to 907 grams of commercially available granulated sugar while mixing it in a Hobart blender. The color did not develop fully. An additional 16 cc of water were required to develop the desired color. The product was wet, not free-flowing, and had to be subjected to a substantial drying operation in order to produce a free-flowing, non-hygroscopic colored sugar powder.

EXAMPLE 3

Conventional Sugar Coloring Process 0.333 grams of food dye were added to 907 grams of commercially available granulated sugar and mixed in a Hobart blender for 30 minutes without the addition of any water. The color intensity of the dry product was very light, unsatisfactory and of poor color quality.

EXAMPLE 4

Conventional Sugar Coloring Process 0.333 grams of food dye were added to 907 grams of commercially available granulated sugar and mixed in a Hobart blender for five minutes. At the end of that period, water was added slowly under agitation until proper color intensity developed. 18 cc of water were necessary to develop the right color. The product was wet and required an additional step of drying to produce the desired free-flowing colored sugar powder.

EXAMPLE 5

Present Invention 6 cc of water were added to 907 grams of commercially available granulated sugar and mixed for two minutes in a Hobart blender. 0.333 grams of a dry food dye were then added to this mixture and blended for another 18 minutes. The product was free-flowing, bright in color and had less than 0.1 percent moisture. This product was excellent in appearance and flowability and did not require an additional drying step.

EXAMPLE 6

Present Invention 10 cc of water were added to 2270 grams of commercially available granulated sugar and mixed for two minutes in a Hobart blender. 0.833 grams of dry No. 5 dye were then added to this mixture and blended for another 13 minutes. The product was free-flowing, bright lemon yellow in color and had less than 0.1 percent moisture. This product was excellent in appearance and flowability and did not require an additional drying step.

EXAMPLE 7

Present Invention 10 cc of water were added to 2270 grams of commercially available granulated sugar and mixed for two minutes in a Hobart blender. 0.394 grams of dry No. 5 dye and 0.440 grams of dry No. 6 dye were then added to this mixture and blended for another 13 minutes. The product was free-flowing, orange in color and had less than 0.1 percent moisture. This product was excellent in appearance and flowability and did not require an additional drying step.

EXAMPLE 8

Present Invention 10 cc of water were added to 4536 grams of commercially available granulated sugar and mixed for two minutes in a Hobart blender. 0.788 grams of No. 5 dye and 0.88 grams of No. 6 dye were then added to the mixture and blended for another 18 minutes. The product was free-flowing, yellow orange in color and had less than 0.1 percent moisture. This product was excellent in appearance and flowability and did not require an additional drying step.

It should be apparent from the foregoing examples that a novel method is provided for coloring sugar crystals so as to produce a dry, free-flowing non-hygroscopic colored sugar powder. We have discovered a process that has important advantages over conventional sugar coloring processes as demonstrated by the foregoing examples.

It should be manifest that while preferred embodiments of the present invention have been shown in Examples 5-8 above, the present invention is nevertheless capable of wide variation within the purview of the invention. For example, the above process may be used to produce any desired type of sugar particle or crystal size. The final particle size of course will be dependent upon the original sugar crystal size to be colored and the speed of agitation that is adopted during the sugar coloring process. As the speed of agitation of all of the ingredients (water, sugar, color) is increased, the particles become finer or smaller in size. Also, although the preferred embodiments of Examples 5-8 illustrate water to sugar proportions of approximately 1 to 3 cc of water per pound of sugar, these preferred portions are capable of some variation within the purview of the invention. More specifically, it has been found that any water to sugar proportion up to 4 cc of water per pound of sugar also produces an improved colored sugar product under the present process. We have discovered a water to sugar proportion above 4 cc of water per pound of sugar will produce a gummy mass and accordingly require an additional drying operation.

It is believed that the present invention, its modus operandi, and many of the advantages attendant thereto should be understood from the foregoing without further description. It also should be manifest that the present invention is capable of wide variation within the purview of the invention as defined in the appended claims.

The embodiment of the invention in which an exclusive property right or privilege is claimed is defined as follows:

We claim:

1. A process for preparing a dried, free-flowing colored sugar product which comprises admixing a small amount of water with dried sugar crystals, adding a dry food dye to said moist sugar, and mixing said water, sugar crystals and dry food dye until the desired color intensity is acquired in the free-flowing, colored sugar product.

2. A process as defined in claim 1, wherein the water is sprayed onto the surfaces of the sugar crystals in order to produce a surface phenomenon thereon and thus condition the crystals for subsequent addition of the dry food dye, whereby an improved sugar coloring operation is provided without the use of a substantial drying operation.

3. A process as defined in claim 1, wherein the dry food dye is added to the sugar crystals while said sugar is in a wetted state and prior to the surfaces of said sugar crystals being completely dried during the mixing operation of said water, sugar crystals and dry food dye.

4. A process as defined in claim 3, wherein the color intensity of the colored sugar is controlled by virtue of adjusting the percentage of surface moisture on the sugar crystals and the mixing time of the water, sugar and dye ingredients.

5. A process as defined in claim 1, wherein said small amount of water comprises up to approximately 4 cc of water per pound of dried sugar crystals to be colored during the process.

6. A process as defined in claim 5, wherein approximately two cc of water are added to each pound of sugar to be colored, and said dry food dye being admixed thereafter into the water-sugar mixture at a moderate speed for a predetermined time until the desired color intensity is acquired in the free-flowing, colored sugar product.

7. A process for preparing a dried, free-flowing colored sugar product which comprises the steps of (1) admixing approximately 6 cc of water to approximately 907 grams of granulated sugar for approximately 2 minutes and (2) admixing approximately 0.333 grams of dry food dye to said water and sugar mixture for approximately 18 minutes so as to produce a free-flowing, bright in color, non-hygroscopic colored sugar product.

* * * * *

UNITED STATES PATENT OFFICE
CERTIFICATE OF CORRECTION

Patent No. 3,802,915          Dated April 9, 1974

Inventor(s) Ashis S. Gupta

It is certified that error appears in the above-identified patent and that said Letters Patent are hereby corrected as shown below:

The spelling of the Assignee is corrected to read:

The Coca-Cola Company

Signed and sealed this 10th day of September 1974.

(SEAL)
Attest:

McCOY M. GIBSON, JR.           C. MARSHALL DANN
Attesting Officer          Commissioner of Patents